United States Patent [19]

Clarke

[11] Patent Number: 4,595,263
[45] Date of Patent: Jun. 17, 1986

[54] PROJECTION LENS SYSTEM

[75] Inventor: John A. Clarke, Carshalton, England

[73] Assignee: U.S. Philips Corporation, New York, N.Y.

[21] Appl. No.: 628,375

[22] Filed: Jul. 5, 1984

[30] Foreign Application Priority Data

Jul. 25, 1983 [GB] United Kingdom ................. 8319940

[51] Int. Cl.$^4$ .............................................. G02B 13/18
[52] U.S. Cl. ...................................... 350/432; 350/475
[58] Field of Search ................................ 350/432, 475

[56] References Cited

U.S. PATENT DOCUMENTS 4,163,604  8/1979  Betensky ........................... 350/432
4,496,223  1/1985  Baker ................................ 350/432

FOREIGN PATENT DOCUMENTS 2091898  8/1982  United Kingdom .

Primary Examiner—John K. Corbin
Assistant Examiner—Rebecca D. Gass
Attorney, Agent, or Firm—Joseph P. Abate

[57] ABSTRACT

A lens system is provided which is suitable for back-projecting an enlarged image of a TV cathode ray tube (CRT). The lens system includes a concave CRT face plate FP and three lens elements L1, L2, L3. L1 and L3 are each of positive power and each have one aspheric surface. L2 is between L1 and L3 and also has one aspheric surface. The powers of the elements are chosen so that $$0.50K < K_1 < 0.90K$$

$$-0.35K < K_2 < 0.20K,$$

and $$0.70K < K_3 < 1.0K$$

where $K_1$ is the power of the first element remote from the object surface, $K_2$ is the power of the second low power element, $K_3$ is the power of the third element adjacent to the object surface and K is the total power of the projection lens.

6 Claims, 7 Drawing Figures

PROJECTION LENS SYSTEM

BACKGROUND OF THE INVENTION

This invention relates to projection lenses and, more particularly, relates to lenses designed to project an enlargement of an image on a cathode ray tube (CRT) such as a phosphor screen of a television set.

In three tube color projection television systems, it is often not necessary to correct the chromatic aberration of each projection lens due to the limited spectral bandwidth of each CRT, thus simplifying lens design to some extent. If a CRT with a flat face plate is used, then a steeply curved field flattener is often necessary adjacent to the face plate to correct Petzval curvature. Such designs are disclosed in U.S. Pat. No. 4,348,081 in which some of the lens elements have aspheric surfaces. In such designs, the field flattener has two disadvantages. Firstly, the steep curve of the field flattener at the edges of the picture means that high angles of incidence occur, rendering aberration correction difficult and producing brightness reduction due to light lost by reflection at the steeply curving surface. Secondly, projection CRT's are usually run at high screen loadings in order to roduce an adequately bright picture for viewing. In consequence, the phosphor can be raised in temperature and thermal quenching of the phosphor can occur, reducing picture brightness with increasing temperature. If the field flattener is in optical contact with the CRT face plate, the effective thickness of the face plate varies considerably across the picture, being especially thick at the picture edges. Face plate cooling is then not constant over the picture and, hence, phosphor temperature is not constant over the picture, producing brightness variations via thermal quenching. The field flattener may, therefore, be separated from the face plate and a coolant circulated between them, incurring additional complexity.

In British Patent Application No. 2,091,898A, the optical problem of the field flattener is largely solved by using a cathode ray tube having a face plate which is concave towards the projection lens. The face plate glass may be strengthened, for example by surface ion exchange, so that it can withstand atmospheric pressure on the concave surface. A single element lens having both surfaces aspherized is used together with a solid prism beam combiner for projecting the images from all three of the CRT's. However, the prism has convex surfaces fitting the concave CRT face plates, rendering cooling difficult.

SUMMARY OF THE INVENTION

It is an object of the invention to simplify beam combining, provide cooling access to face plates of substantially constant thickness and to provide high quality imaging out to the picture edges with a wide aperture lens having a short projection throw.

The invention provides a lens system for projecting an image of a concave object surface onto a planar display screen, characterized in that the projection lens comprises first and third elements, each of positive power and each having one aspheric surface, and a second element between the first and third elements, said second element having one aspheric surface, the powers of the elements being chosen so that $$0.50K < K_1 < 0.90K$$

$$-0.35K < K_2 < 0.20K,$$

and $$0.70K < K_3 < 1.0K$$

where $K_1$ is the power of the first element remote from the object surface, $K_2$ is the power of the second element, $K_3$ is the power of the third element adjacent to the object surface and K is the total power of the projection lens, each aspheric surface being defined by the following relationship:

$$Z = \frac{Cs^2}{1 + \sqrt{1 - \epsilon C^2 s^2}} + a_4 s^4 + a_6 s^6 + a_8 s^8 + a_{10} s^{10}$$

where Z is a deviation, in the axial direction, of the surface from a plane normal to the optical axis and tangent to the surface at its pole for a zone of the surface which is at a distance s from the axis, C is a curvature of the surface on the axis, $\epsilon$ is a conic constant, and $a_4$, $a_6$, $a_8$ and $a_{10}$ are constants for the surface.

Lenses in accordance with the invention can be designed to realize either the high definition required in 1249 line television with an acceptably short throw distance or the definition required in 525 or 625 line television with a particularly large projection angle and, hence, short throw distance which is desirable if the TV cabinet is to be particularly compact.

In projection television sets, the image may be projected onto a translucent screen from the back, the CRT and lens being behind the screen and within a free standing cabinet, the front of which comprises the screen. It is desirable to reduce the depth of the cabinet as much as possible and at least below a value such that the T.V. set can easily pass through ordinary living room doors. Folding mirrors are usually used within the cabinet to reduce the depth. Using a lens in accordance with the invention, the number of folding mirrors can be reduced because the projection distance, or throw, from the lens to the screen is reduced and because a wide projection angle is provided so that the projected picture size is maintained. Using a lens system in accordance with the invention, there is provided a projection television system including a cathode ray tube having a face plate concave towards the lens system. Also, using a lens system in accordance with the invention, there is provided a color television projection system comprising first, second and third cathode ray tubes having red, blue and green phosphors respectively provided on concave face plates, a lens system associated with each cathode ray tube, each lens system being arranged to project an image of the concave face plate onto a common display screen.

BRIEF DESCRIPTION OF THE DRAWING

Embodiments of the invention will now be described, by way of example, with reference to the accompanying drawings, in which.

DESCRIPTION OF THE PREFERRED EMBODIMENTS

Figure 1:
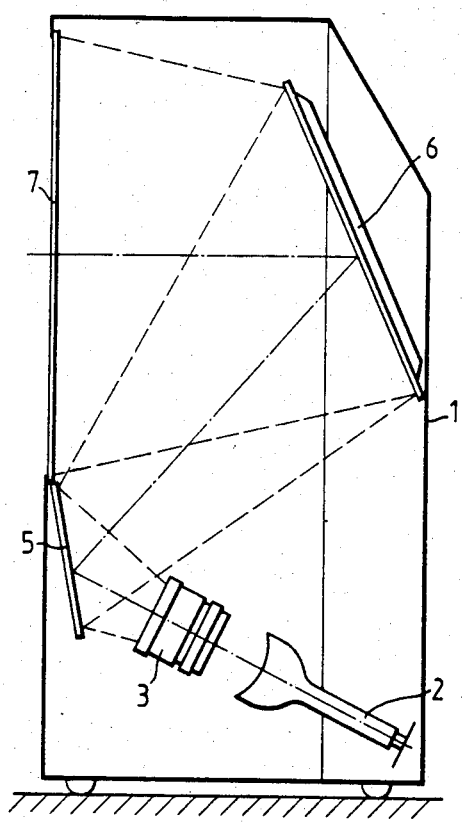
FIG. 1 shows a typical layout of a projection television system to which a lens system in accordance with the invention may be applied.

Referring to FIG. 1, a free standing cabinet 1 contains a back projection television display system comprising a cathode ray tube (CRT) 2 having a face plate concave towards a projection lens 3, front metallized folding mirrors 5 and 6 and a translucent projection screen 7. The screen may be a Fresnel screen and may also have a light scattering power which is less in the vertical plane than in the horizontal plane to avoid wasting projected light. For color television, three CRTs and three lenses are used in line normal to the plane of the drawing. Mirrors 5, 6 are then extended in the direction normal to the drawing to accept light from all three CRTs. The outermost CRTs and lenses are inclined inwards so that the projected red, blue and green rasters are brought into coincidence on the screen 7.

Figure 4:
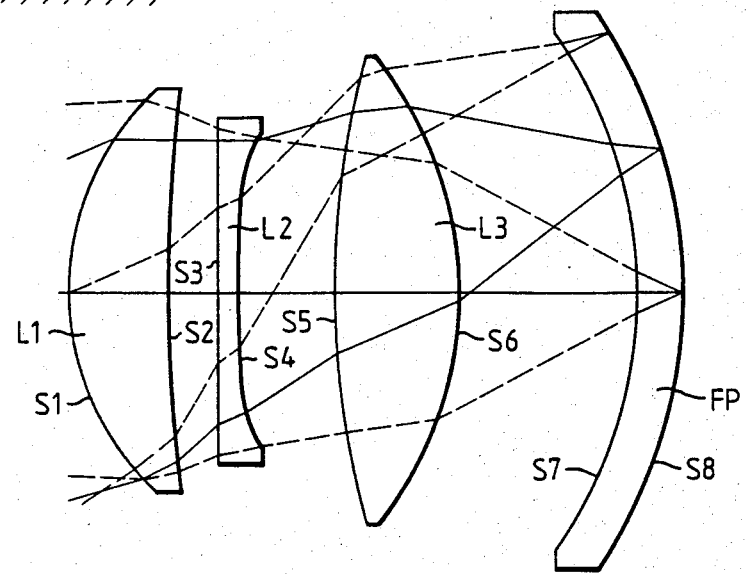
FIG. 4 shows a medium definition lens system with glass elements having a projection angle of ±37°.
Figure 2:
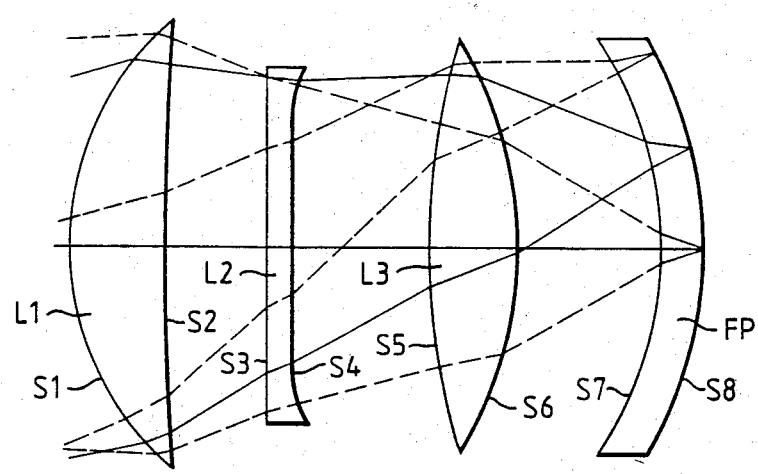
FIG. 2 shows a lens system designed for production with the three lens elements made entirely of a plastics material and suitable for high definition television at a projection angle of ±26°.
Figure 3:
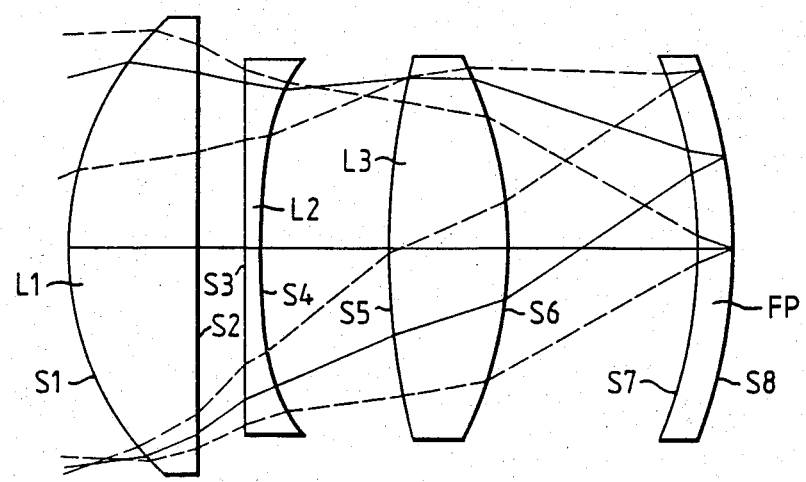
FIG. 3 shows a high definition lens system with glass elements.

The projection lens 3 for such a television display system can be realized by using only three lens elements eac having one aspheric surface. Such a lens 3 has adequate quality for high definition 1249 line television or for 525 line or 625 line television with an exceptionally large projection angle. The Petzval curvature of the lens 3 fits the concave CRT face plate closely, removing the need for a field flattener. FIGS. 2, 3 and 4 show three different examples of the lens system having different projection angles and designed for different purposes. FIG. 2 is an all-plastics design, FIGS. 3 and 4 being designs with glass elements. In these figures, the lens elements are designated by L followed by a numeral indicating the sequential position of the element from the image or projection screen end to the CRT face plate FP. The surfaces of the elements are designated by S followed by a numeral in the same sequence as the elements. Positive surfaces are convex towards the projection screen and negative surfaces are concave towards the projection screen.

The powers of the three elements are within the ranges given by:

$$0.50K < K_1 < 0.90K,$$

$$-0.35K < K_2 < 0.20K$$

and $$0.70K < K_3 < 1.0K$$

where K is the power of the whole lens equal to the reciprocal of its focal length and $K_1$, $K_2$ and $K_3$ are the powers of the three elements equal to the reciprocal of their respective focal lengths, elements $K_1$ and $K_3$ always being of positive power. $L_1$ is generally convex towards the projection screen and $L_3$ is generally a biconvex element. All three elements have one aspheric surface for detailed aberration correction. Surfaces S2, S4 and S5 are asphericized in the three design example given below. The aspheric surfaces are defined by the expression $$Z = \frac{Cs^2}{1 + \sqrt{1 - \epsilon C^2 s^2}} + a_4 s^4 + a_6 s^6 + a_8 s^8 + a_{10} s^{10}$$

where Z is a deviation, in the axial direction, of the surface from a plane normal to the optical axis and tangent to the surface at its pole for a zone of the surface which is at a distance s from the axis, C is a curvature of the surface at the pole, $\epsilon$ is a conic constant and $a_4$, $a_6$, $a_8$ and $a_{10}$ are constants for the surface. The first term of Z defines the basic shape of the whole surface. If $\epsilon$ has the valve 1, the basic shape is a sphere. For parabolic, ellipsodal or hyperbolic basic shapes, $\epsilon$ has the values 0, between 0 and 1 or less than 0, respectively.

The following Tables I, II and III given the detailed design of the embodiments of FIGS. 2, 3 and 4, respectively.

TABLE I

Focal length 13.7 cm. Relative aperture f/1.0
Projection angle ±26°. Throw 1.16 m
Wavelength 525 nm. Magnification 8.26 X

| | | Polar radius, cm | Axial thickness, cm | Axial separation, cm | Refractive index |
|---|---|---|---|---|---|
| L1 | S1 | 9.589 | — | — | — |
|  | S2 | 239.00 | 3.300 | — | 1.490 |
| L2 | S3 | plane | — | 3.415 | — |
|  | S4 | −93.982 | 0.850 | — | 1.490 |
| L3 | S5 | 20.031 | — | 4.632 | — |
|  | S6 | −12.973 | 2.996 | — | 1.490 |
| FP | S7 | −13.333 | — | 4.775 | — |
|  | S8 | −13.333 | 1.500 | — | 1.520 |

Aspheric surfaces: S2, S4, S5

| | S2 | S4 | S5 |
|---|---|---|---|
| C | 0.00418 | −0.0106 | 0.0499 |
| $\epsilon$ | 1 | 1 | 1 |
| $a_4$ | $+0.8870 \times 10^{-4}$ | $+0.2880 \times 10^{-3}$ | $-0.8359 \times 10^{-4}$ |
| $a_6$ | $-0.1131 \times 10^{-5}$ | $+0.4906 \times 10^{-5}$ | $+0.1480 \times 10^{-5}$ |
| $a_8$ | $+0.2566 \times 10^{-8}$ | $-0.4938 \times 10^{-7}$ | $-0.1753 \times 10^{-7}$ |
| $a_{10}$ | 0 | $+0.3060 \times 10^{-8}$ | 0 |

Element values:

| | Focal length, cm | Power, cm$^{-1}$ | Relative Power |
|---|---|---|---|
| L1 + L2 + L3 | 13.7 | 0.073 | 1 |
| L1 | 20.29 | 0.049 | 0.68 |
| L2 | 191.8 | 0.005 | 0.07 |
| L3 | 16.56 | 0.060 | 0.83 |

TABLE II

Focal length 14.2 cm. Relative aperture f/0.95
Projection angle ±22.6°. Throw 1.37 m
Wavelength 525 nm. Magnification 9.25 X

| | | Polar radius, cm | Axial thickness, cm | Axial separation, cm | Refractive index |
|---|---|---|---|---|---|
| L1 | S1 | 9.833 | — | — | — |
|  | S2 | 115.11 | 4.280 | — | 1.5727 |
| L2 | S3 | plane | — | 1.723 | — |
|  | S4 | 31.870 | 0.500 | — | 1.5727 |
| L3 | S5 | 22.369 | — | 4.316 | — |
|  | S6 | −13.923 | 4.012 | — | 1.5727 |
| FP | S7 | −15.625 | — | 6.428 | — |
|  | S8 | −16.770 | 1.200 | — | 1.520 |

Aspheric surfaces: S2, S4, S5

| | S2 | S4 | S5 |
|---|---|---|---|
| C | 0.00869 | 0.03138 | 0.0447 |
| $\epsilon$ | 1 | 1 | 1 |
| $a_4$ | $-0.3958 \times 10^{-4}$ | $+0.4186 \times 10^{-3}$ | $-0.3470 \times 10^{-4}$ |
| $a_6$ | $-0.6202 \times 10^{-6}$ | $+0.3424 \times 10^{-5}$ | $-0.7809 \times 10^{-6}$ |
| $a_8$ | $+0.7273 \times 10^{-8}$ | $+0.6976 \times 10^{-7}$ | $+0.2470 \times 10^{-7}$ |
| $a_{10}$ | $+0.8549 \times 10^{-10}$ | $+0.2836 \times 10^{-9}$ | $-0.3791 \times 10^{-10}$ |

Element values: Relative

TABLE II-continued

| Focal length 14.2 cm. | Relative aperture f/0.95 |
| Projection angle ±22.6°. | Throw 1.37 m |
| Wavelength 525 nm. | Magnification 9.25 X |

|  | Focal length, cm | Power, cm$^{-1}$ | Power |
|---|---|---|---|
| L1 + L2 + L3 | 14.2 | 0.0703 | 1 |
| L1 | 18.500 | 0.0541 | 0.77 |
| L2 | −55.694 | −0.0180 | −0.26 |
| L3 | 15.613 | 0.0605 | 0.91 |

TABLE III

| Focal length 8.93 cm. | Relative aperture f/1.0 |
| Projection angle ±37.2°. | Throw 0.75 m |
| Wavelength 525 nm. | Magnification 8 X |

|  |  | Polar radius, cm | Axial thickness, cm | Axial separation, cm | Refractive index |
|---|---|---|---|---|---|
| L1 | S1 | 6.308 | — | — | — |
|  | S2 | 23.947 | 2.273 | — | 1.5727 |
| L2 | S3 | 100.837 | — | 1.159 | — |
|  | S4 | 54.609 | 0.507 | — | 1.5727 |
| L3 | S5 | 17.901 | — | 2.301 | — |
|  | S6 | −8.569 | 2.870 | — | 1.5727 |
| FP | S7 | −10.452 | — | 4.174 | — |
|  | S8 | −10.425 | 1.200 | — | 1.520 |

Aspheric surfaces: S2, S4, S5

|  | S2 | S4 | S5 |
|---|---|---|---|
| C | 0.0418 | 0.0183 | 0.0559 |
| $\epsilon$ | 1 | 1 | 1 |
| $a_4$ | −0.6521 × 10$^{-4}$ | +0.1338 × 10$^{-2}$ | −0.2446 × 10$^{-3}$ |
| $a_6$ | −0.2200 × 10$^{-4}$ | +0.4718 × 10$^{-4}$ | +0.9434 × 10$^{-5}$ |
| $a_8$ | +0.4278 × 10$^{-6}$ | +0.1058 × 10$^{-5}$ | −0.1444 × 10$^{-6}$ |
| $a_{10}$ | +0.5720 × 10$^{-8}$ | +0.1786 × 10$^{-8}$ | −0.4900 × 10$^{-9}$ |

Element values:

|  | Focal length, cm | Power, cm$^{-1}$ | Relative Power |
|---|---|---|---|
| L1 + L2 + L3 | 8.93 | 0.112 | 1 |
| L1 | 14.285 | 0.070 | 0.63 |
| L2 | −208.8 | −0.0048 | −0.04 |
| L3 | 10.535 | 0.095 | 0.85 |

Figure 5:
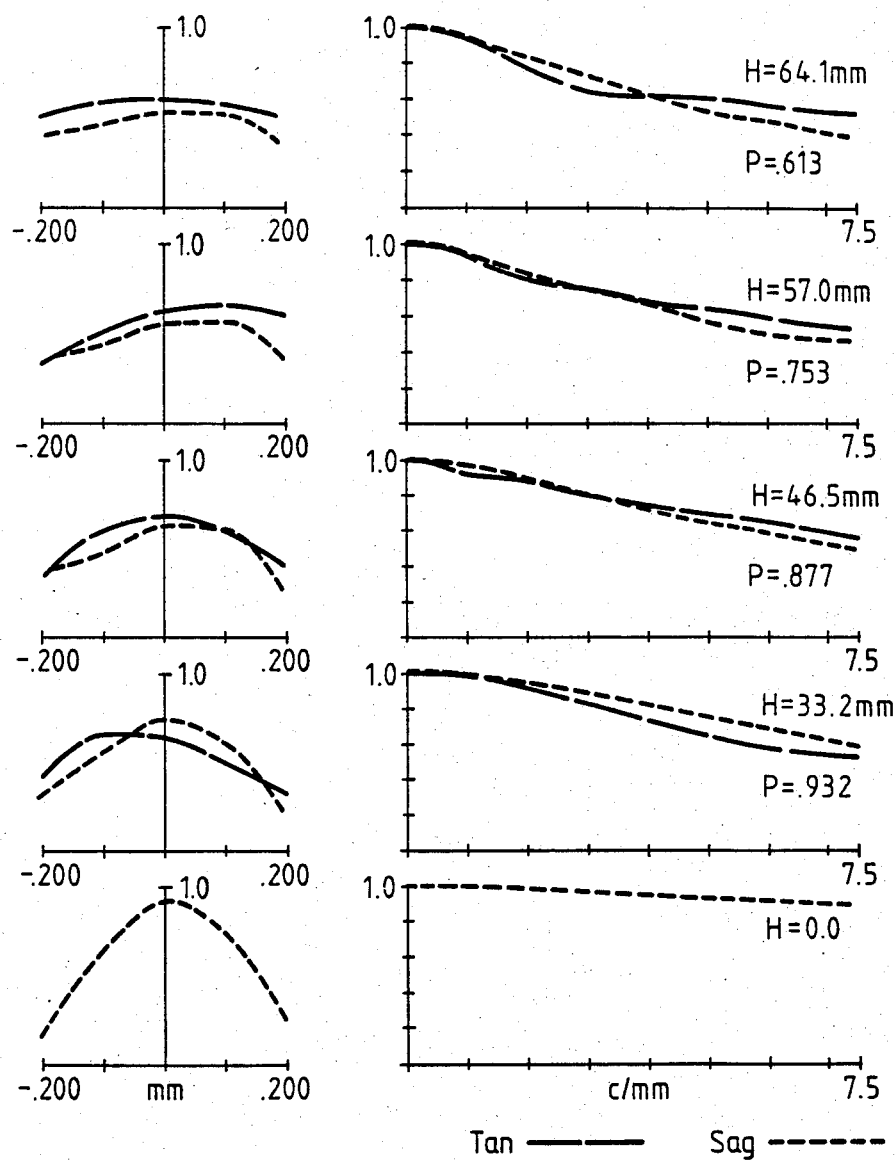
FIGS. 5, 6 and 7 show the modulation transfer functions and defocus functions of the lens systems of FIGS. 2, 3 and 4, respectively.
Figure 6:
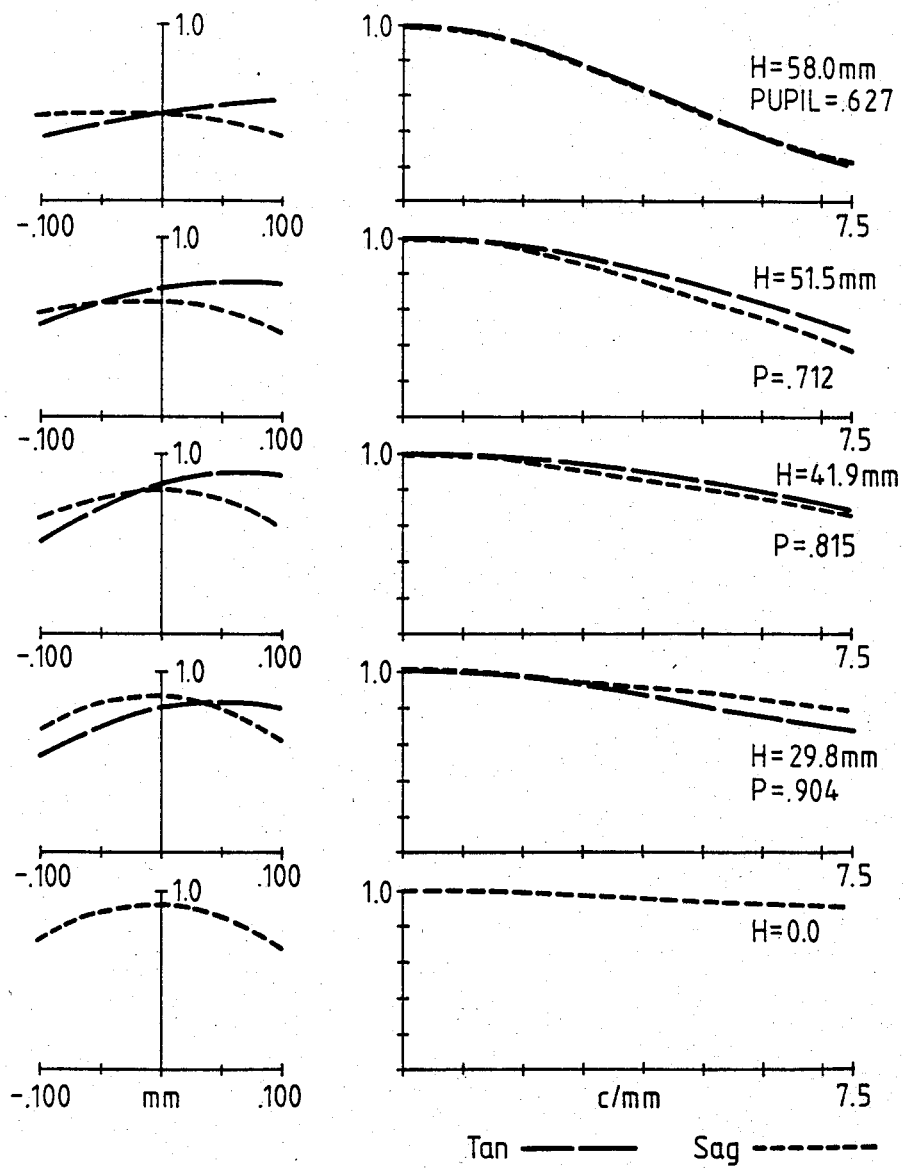

FIGS. 5 and 6 show the performance of the lenses of FIGS. 2 and 3, respectively. The column of five graphs on the right shows the modulation transfer functions (MTF) plotted vertically at various distance H off axis at the CRT face plate as a function of spatial frequency for the tangential (Tan) and sagittal (Sag) directions. For each value of H, the value of the effective lens aperture area P is give relative to the value on axis. The MTFs are plotted out to 7.5 cycles per mm on the CRT face plate rather than on the image as projected. This is because the lens design procedure traces rays from points on the projection screen onto the CRT face plate. With a face plate diameter of 120 mm, a 1249 line picture can be adequately resolved provided the MTF has a value 0.5 or better out to 5.0 cycles per mm. It will be seen that the FIG. 2 design, the all-plastics lens, achieves this target all over the picture with a substantial margin in most of the picture. The all glass design of FIG. 3, which has 10% greater light collecting power, achieves a similar performance. H=60.0 mm is roughly at the picture corners.

The column of five graphs on the left shows the variation of the MTF as a function of defocus distance at the CRT face plate. The base value of the MTF is 5.0 cycles per mm. It will be seen that there is a substantial margin of about ±0.15 mm for defocus error and for face plate manufacturing tolerance. Over a diameter of 120 mm, this gives ±1 mm tolerance on face plate radius.

Figure 7:
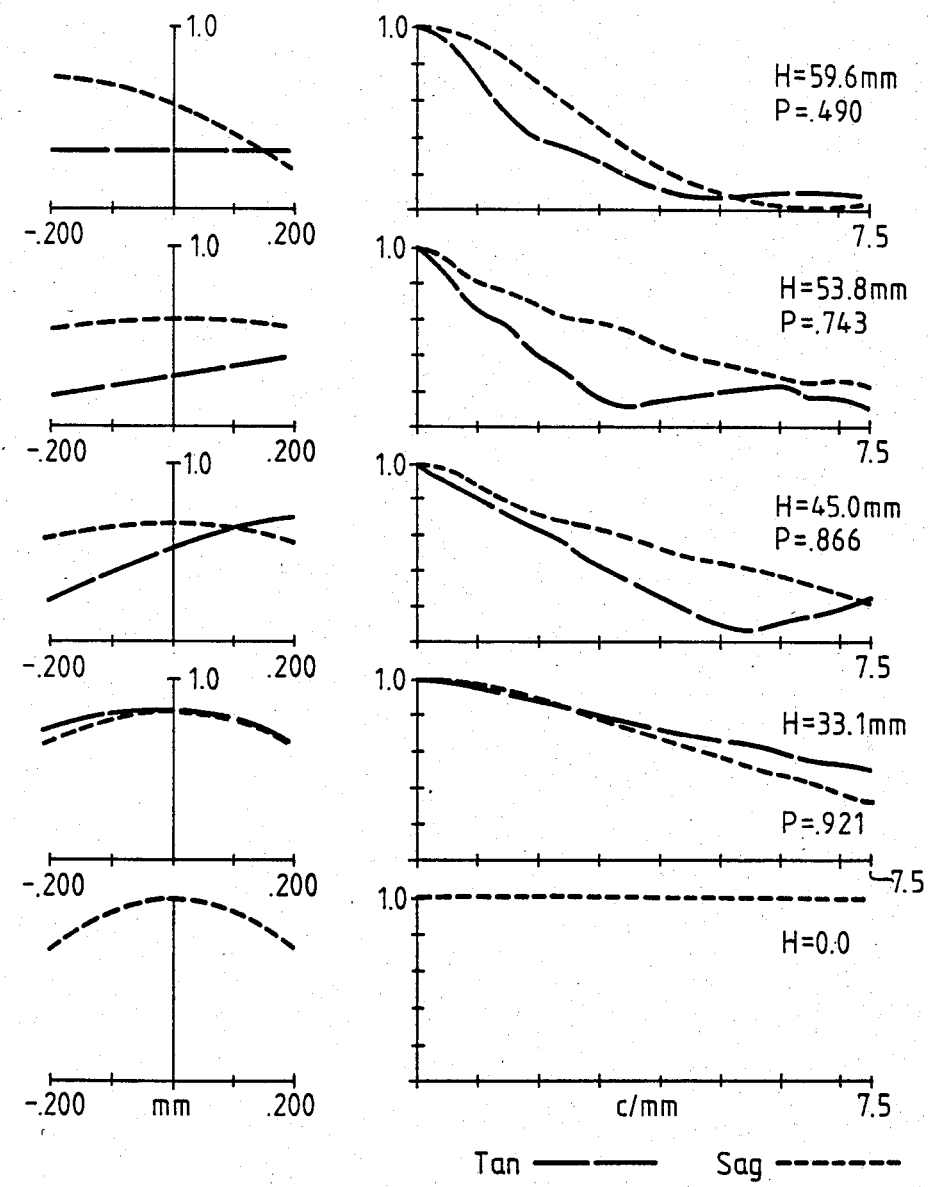

FIG. 7 shows the performance of the extra wide angle, all glass design of FIG. 4. The base value of the MTF on the defocus curves is 2.5 cycles per mm, this lens being designed for lower definition 525/625 line T.V. If an average is taken of the tangential and sagittal MTFs, it will be seen that an MTF of 0.5 is achieved approximately at the picture edges. The thow distance of 0.75 m is particularly short and, combined with a projection angle of ±37.2°, permits a very compact T.V. cabinet design.

In the above designs, the aspheric surface can be on either side of each element. The CRT face plate can have concentric surfaces or each surface can have the same radius or slightly different radii consistent with the face plate thickness remaining substantially constant or chosen so that the face plate has weak positive or negative power. Either face plate surface may be aspherized to further improve resolution.

For two element lens designs generally suitable for lower definition applications, reference may be made to copending British Patent Application No. 8,319,938.

I claim:

1. A lens system for projecting an image of a concave object surface onto a planar display screen, characterized in that the system lens, comprises first and third elements, each of positive power and each having one aspheric surface, and a second element between first and third elements, said second element having one aspheric surface, the powers of the elements being chosen so that $$0.50K < K_1 < 0.90K$$

$$-0.35K < K_2 < 0.20K,$$

and $$0.70K < K_3 < 1.0K$$

where $K_1$ is the power of the first element remote from the object surface, $K_2$ is the power of the second element, $K_3$ is the power of the third element adjacent to the object surface and K is the total power of the projection lens, each aspheric surface being defined by the following relationship:

$$Z = \frac{Cs^2}{1 + \sqrt{1 - \epsilon C^2 s^2}} + a_4 s^4 + a_6 s^6 + a_8 s^8 + a_{10} s^{10}$$

where Z is a deviation, in the axial direction, of the surface from a plane normal to the optical axis and tangent to the surface at its pole for a zone of the surface which is at a distance s from the axis, C is a curvature of the surface on the axis, $\epsilon$ is a conic constant, and $a_4$, $a_6$, $a_8$ and $a_{10}$ are constants for the surface.

2. A lens system as claimed in claim 1, having focal length 13.7 cm at a wavelength of 525 nm, relative aperture f/1.0, projection angle ±26°, throw 1.16 m and magnification 8.26X, and being described substantially as follows:

|  |  | Polar radius, cm | Axial thickness, cm | Axial separation, cm | Refractive index |
|---|---|---|---|---|---|
| L1 | S1 | 9.589 | — | — | — |
|  | S2 | 239.00 | 3.300 | — | 1.490 |
| L2 | S3 | plane | — | 3.415 | — |
|  | S4 | −93.982 | 0.850 | — | 1.490 |
| L3 | S5 | 20.031 | — | 4.632 | — |
|  | S6 | −12.973 | 2.996 | — | 1.490 |

-continued

| | | | | | |
|---|---|---|---|---|---|
| FP | S7 | −13.333 | — | 4.775 | — |
| | S8 | −13.333 | 1.500 | — | 1.520 |

Aspheric surfaces: S2, S4, S5

| | S2 | S4 | S5 |
|---|---|---|---|
| C | 0.00418 | −0.0106 | 0.0499 |
| $\epsilon$ | 1 | 1 | 1 |
| $a_4$ | $+0.8870 \times 10^{-4}$ | $+0.2880 \times 10^{-3}$ | $-0.8359 \times 10^{-4}$ |
| $a_6$ | $-0.1131 \times 10^{-5}$ | $+0.4906 \times 10^{-5}$ | $+0.1480 \times 10^{-5}$ |
| $a_8$ | $+0.2566 \times 10^{-8}$ | $-0.4938 \times 10^{-7}$ | $-0.1753 \times 10^{-7}$ |
| $a_{10}$ | 0 | $+0.3060 \times 10^{-8}$ | 0 |

Element values:

| | Focal length, cm | Power, cm$^{-1}$ | Relative Power |
|---|---|---|---|
| L1 + L2 + L3 | 13.7 | 0.073 | 1 |
| L1 | 20.29 | 0.049 | 0.68 |
| L2 | 191.8 | 0.005 | 0.07 |
| L3 | 16.56 | 0.060 | 0.83 | where L1, L2, L3, FP are successive lens elements from the image end and S1–S8 are successive element surfaces, positive surfaces being convex towards the image end and negative surfaces being concave towards the image end.

3. A lens system as claimed in claim 1, having focal length 14.2 cm at a wavelength of 525 nm, relative aperture f/0.95, projection angle ±22.62° throw 1.37 m and magnification 9.25X, and being described substantially as follows:

| | | Polar radius, cm | Axial thickness, cm | Axial separation, cm | Refractive index |
|---|---|---|---|---|---|
| L1 | S1 | 9.833 | — | — | — |
| | S2 | 115.11 | 4.280 | — | 1.5727 |
| L2 | S3 | plane | — | 1.723 | — |
| | S4 | 31.870 | 0.500 | — | 1.5727 |
| L3 | S5 | 22.369 | — | 4.316 | — |
| | S6 | −13.923 | 4.012 | — | 1.5727 |
| FP | S7 | −15.625 | — | 6.428 | — |
| | S8 | −16.770 | 1.200 | — | 1.520 |

Aspheric surfaces: S2, S4, S5

| | S2 | S4 | S5 |
|---|---|---|---|
| C | 0.00869 | 0.03138 | 0.0447 |
| $\epsilon$ | 1 | 1 | 1 |
| $a_4$ | $-0.3958 \times 10^{-4}$ | $+0.4186 \times 10^{-3}$ | $-0.3470 \times 10^{-4}$ |
| $a_6$ | $-0.6202 \times 10^{-6}$ | $+0.3424 \times 10^{-5}$ | $-0.7809 \times 10^{-6}$ |
| $a_8$ | $+0.7273 \times 10^{-8}$ | $+0.6976 \times 10^{-7}$ | $+0.2470 \times 10^{-7}$ |
| $a_{10}$ | $+0.8549 \times 10^{-10}$ | $+0.2836 \times 10^{-9}$ | $-0.3791 \times 10^{-10}$ |

Element values:

| | Focal length, cm | Power, cm$^{-1}$ | Relative Power |
|---|---|---|---|
| L1 + L2 + L3 | 14.2 | 0.0703 | 1 |
| L1 | 18.500 | 0.0541 | 0.77 |
| L2 | −55.694 | −0.0180 | −0.26 |
| L3 | 15.613 | 0.0605 | 0.91 | where L1, L2, L3, EP are successive lens elements from the image end and S1–S8 are successive element surfaces, positive surfaces being convex towards the image end and negative surfaces being concave towards the image end.

4. A lens system as claimed in claim 1 having focal length 8.93 cm at a wavelength of 525 nm, relative aperture f/1.0, projection angle −37.23° throw 0.75 m and magnification 8X, and being described substantially as follows:

| | | Polar radius, cm | Axial thickness, cm | Axial separation, cm | Refractive index |
|---|---|---|---|---|---|
| L1 | S1 | 6.308 | — | — | — |
| | S2 | 23.947 | 2.273 | — | 1.5727 |
| L2 | S3 | 100.837 | — | 1.159 | — |
| | S4 | 54.609 | 0.507 | — | 1.5727 |
| L3 | S5 | 17.901 | — | 2.301 | — |
| | S6 | −8.569 | 2.870 | — | 1.5727 |
| FP | S7 | −10.452 | — | 4.174 | — |
| | S8 | −10.425 | 1.200 | — | 1.520 |

Aspheric surfaces: S2, S4, S5

| | S2 | S4 | S5 |
|---|---|---|---|
| C | 0.0418 | 0.0183 | 0.0559 |
| $\epsilon$ | 1 | 1 | 1 |
| $a_4$ | $-0.6521 \times 10^{-4}$ | $+0.1338 \times 10^{-2}$ | $-0.2446 \times 10^{-3}$ |
| $a_6$ | $-0.2200 \times 10^{-4}$ | $+0.4718 \times 10^{-4}$ | $+0.9434 \times 10^{-5}$ |
| $a_8$ | $+0.4278 \times 10^{-6}$ | $+0.1058 \times 10^{-5}$ | $-0.1444 \times 10^{-6}$ |
| $a_{10}$ | $+0.5720 \times 10^{-8}$ | $+0.1786 \times 10^{-8}$ | $-0.4900 \times 10^{-9}$ |

Element values:

| | Focal length, cm | Power, cm$^{-1}$ | Relative Power |
|---|---|---|---|
| L1 + L2 + L3 | 8.93 | 0.112 | 1 |
| L1 | 14.285 | 0.070 | 0.63 |
| L2 | −208.8 | −0.0048 | −0.04 |
| L3 | 10.535 | 0.095 | 0.85 | where L1, L2, L3, FP are successive lens elements from the image end and S1–S8 are successive element surfaces, positive surfaces being convex towards the image end and negative surfaces being concave towards the image end.

5. A projection television system comprising a cathode ray tube having a face plate concave towards a lens system, characterized in that the lens system includes first and third lens elements, each of positive power and each having one aspheric surface, and a second lens element disposed between the first and third lens elements, said second lens element having one aspheric surface, the powers of the lens elements being chosen so that $$0.50K < K_1 < 0.90K$$

$$-0.35K < K_2 < 0.20K,$$

and $$0.70K < K_3 < 1.0K$$

where $K_1$ is the power of the first lens element remote from the object surface, $K_2$ is the power of the second lens element, $K_3$ is the power of the third lens element adjacent to the object surface and K is the total power of the lens system, each aspheric surface being defined by the following relationship:

$$Z = \frac{Cs^2}{1 + \sqrt{1 - \epsilon C^2 s^2}} + a_4 s^4 + a_6 s^6 + a_8 s^8 + a_{10} s^{10}$$

where Z is a deviation, in the axial direction, of the surface from a plane normal to the optical axis and tangent to the surface at its pole for a zone of the surface which is at a distance s from the axis, C is a curvature of the surface on the axis, $\epsilon$ is a conic constant, and $a_4$, $a_6$, $a_8$ and $a_{10}$ are constants for the surface.

6. A color television projection system comprising first, second and third cathode ray tubes having red, blue and green phosphors, respectively, provided on concave face plates, a lens system associated with each cathode ray tube, each lens system being arranged to project an image on the associated concave face plate onto a common display screen, characterized in that each lens system includes first and third lens elements, each of positive power and each having one aspheric surface, and a second lens element between the first and third lens elements, said second lens element having one aspheric surface, the powers of the lens elements being chosen so that $$0.50K < K_1 < 0.90K$$

$$-0.35K < K_2 < 0.20K,$$

and $$0.70K < K_3 < 1.0K$$

where $K_1$ is the power of the first lens element remote from the object surface, $K_2$ is the power of the second lens element, $K_3$ is the power of the third lens element adjacent to the object surface and K is the total power of the lens system, each aspheric surface being defined by the following relationship:

$$Z = \frac{Cs^2}{1 + \sqrt{1 - \epsilon C^2 s^2}} + a_4 s^4 + a_6 s^6 + a_8 s^8 + a_{10} s^{10}$$

where Z is a deviation, in the axial direction, of the surface from a plane normal to the optical axis and tangent to the surface at its pole for a zone of the surface which is at a distance s from the axis, C is a curvature of the surface on the axis, $\epsilon$ is a conic constant, and $a_4$, $a_6$, $a_8$ and $a_{10}$ are constants for the surface.

* * * * *

UNITED STATES PATENT AND TRADEMARK OFFICE
CERTIFICATE OF CORRECTION

PATENT NO. : 4,595,263
DATED : June 17, 1986
INVENTOR(S) : JOHN A CLARKE

It is certified that error appears in the above-identified patent and that said Letters Patent is hereby corrected as shown below:

IN THE CLAIMS:

Col. 6, Claim 1, Line 23, Change "system lens" to --lens system--;

line 25, After "between" insert --the--;

Col. 7, Claim 2, line 20, Change "$1" to --S1--;

Claim 4, line 60, After "claim 1" insert --,--. (comma)

Signed and Sealed this

Twenty-eighth Day of April, 1987

Attest:

DONALD J. QUIGG

*Attesting Officer*　　*Commissioner of Patents and Trademarks*